UNITED STATES PATENT OFFICE.

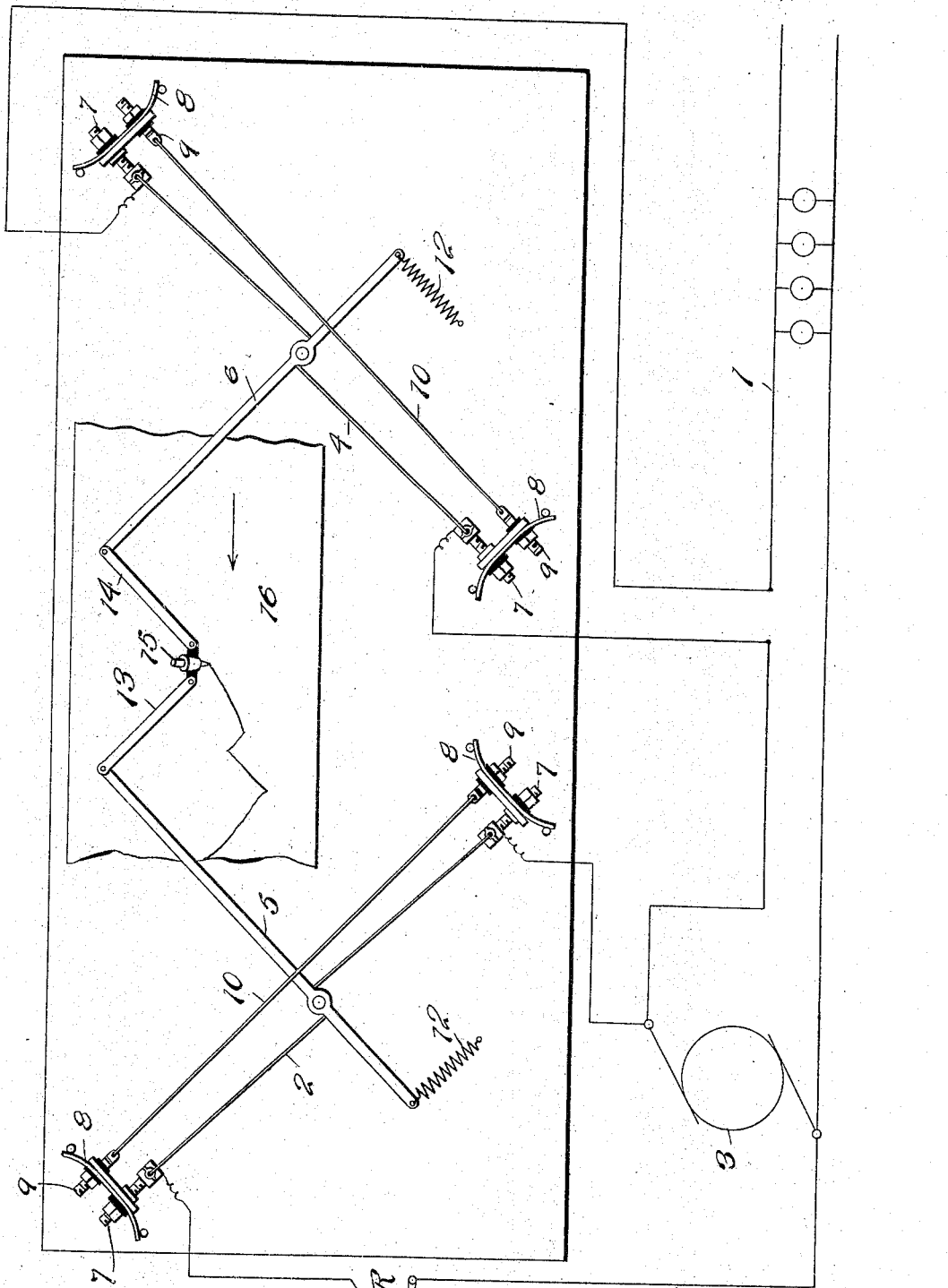

MAURICE J. WOHL, OF NEW YORK, AND HARRY HERTZBERG, OF BROOKLYN, NEW YORK, ASSIGNORS TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

RECORDING ELECTRICAL METER.

947,266.

Specification of Letters Patent.

Patented Jan. 25, 1910.

Application filed March 16, 1908. Serial No. 421,429.

*To all whom it may concern:*

Be it known that we, MAURICE J. WOHL and HARRY HERTZBERG, citizens of the United States, and residents, respectively, of the city of New York, borough of Manhattan, county and State of New York, and of the city of New York, borough of Brooklyn, county of Kings, and State of New York, have invented certain new and useful Improvements in Recording Electrical Meters, of which the following is a specification.

This invention relates to a new principle in electrical instrument construction, designed particularly for recording wattmeter readings.

From a structural standpoint, the invention may be said to consist in the combination of two levers connected by two links pivoted thereto, said links being also pivoted to each other and at their pivotal junction carrying a marker or stylus, and a thermal expansible conductor for operating each lever and its connected link.

Viewing the invention in the light of its applicability for recording wattmeter readings, it may be broadly described as consisting of a circuit, a thermal expansible conductor connected therein to expand and contract under variations in voltage, a second thermal expansible conductor connected in the circuit to be affected by variations in amperage, and a freely movable marker connected to said conductors in such fashion as to have a composite or resultant movement imparted to it.

More broadly still, the invention may be regarded as an electrical meter in which the indicator or recorder is actuated by a thermal expansible conductor.

The invention is illustrated diagrammatically in the accompanying drawing.

1 indicates a circuit.

2 is a thermal expansible conductor, or resistance wire, connected across the terminals of the source of current 3, or bridging any portion of the leads where it is desired to measure the potential. 4 is a thermal expansible conductor or wire connected in circuit, so as to be affected by variations in amperage. Intermediate their lengths these conductors 2 and 4 are connected to levers 5 and 6, each at two points at opposite sides of the pivot of its lever, so that contraction of the conductors under the influence of current variations therein causes the levers to swing. The outer ends of the conductors are connected by tension adjusting devices 7 to spring supports 8, whereby the conductors are stretched between these supports under some degree of tension. Also stretched between each pair of supports 8, being connected thereto by tension adjusting devices 9, is a compensating wire 10. Each wire 10 is suitably insulated from its companion conductor 2 or 4, so as to carry no current, but is adapted to have the same total linear expansion per unit change in atmospheric temperature as its companion conductor. It follows, therefore, that changes in the surrounding temperature will not cause the conductors 2 and 4 to swing the levers 5 and 6; because each compensating wire and its companion conductor expand and contract equally under such conditions, and, the compensating wire, being connected only to the spring supports, causes the latter to flex one way or other by just this amount: therefore, the outer ends of the conductor 2 or 4 suffer displacement, but not the points on the conductor which are connected to the lever. Of course, the expansion of the conductors cannot be relied on positively to swing the levers 5 and 6; consequently, springs, or equivalent constructions 12, are provided for swinging the levers in the direction opposite to that in which they are swung by the contraction of the conductors.

The levers 5 and 6, it will be seen, are disposed angularly with reference to each other, and, at their proximate ends, are pivoted, respectively, to links 13 and 14, disposed angularly with reference to the levers, and also with reference to each other. These links are also pivoted to each other, and, at their pivotal junction, carry a marker or stylus 15, which is shown as coöperating with a traveling tape 16. The marker is thus given a composite or resultant movement, much as in the "telautograph"; and, the parts being suitably arranged and adjusted, the tracing of the marker constitutes a record of watts.

It will be seen that the principle of the thermal expansible conductor operating an indicator or recorder may be given a very wide range of application in different types of electrical instruments.

What is claimed as new is:

1. An electrical meter, comprising an indicator or recorder, and a pair of coöperating thermal expansible conductors connected with said indicator or recorder to operate the same.

2. The combination of two levers, two links pivoted respectively to said levers and pivoted also to each other, a marker carried at the pivotal junction of said links, and a thermal expansible conductor connected with each lever for operating the same and its connected link.

3. The combination of two levers, two links pivoted respectively to said levers and pivoted also to each other, a marker carried at the pivotal junction of said links, a thermal expansible conductor for each lever, each conductor being connected intermediate its length to the corresponding lever at two points at opposite sides of the pivot of the latter, spring supports between which said conductors are stretched, and means for swinging the levers in the direction opposite to that in which they are swung by the contraction of the conductors.

4. The combination of two levers, two links pivoted respectively to said levers and pivoted also to each other, a marker carried at the pivotal junction of said links, a thermal expansible conductor for each lever, each conductor being connected intermediate its length to the corresponding lever at two points at opposite sides of the pivot of the latter, spring supports between which said conductors are stretched, a compensating wire, substantially as described, also stretched between each pair of supports, and means for swinging the levers in the direction opposite to that in which they are swung by the contraction of the conductors.

5. The combination of two levers, two links pivoted respectively to said levers and pivoted also to each other, a marker carried at the pivotal junction of said links, means including primarily a thermal expansible conductor for operating each lever and its connected link through the expansion and contraction of said conductor due to current variations therein, and compensating means whereby said levers are unaffected by expansion and contraction of said conductors due to variations in the surrounding temperature.

6. The combination of a circuit, a thermal expansible conductor connected therein to expand and contract under variations in voltage, a second thermal expansible conductor connected in the circuit to expand and contract under variations in amperage, and a freely movable marker connected to said conductors in such fashion as to have a composite or resultant movement imparted to it.

Signed at New York in the county of Kings and State of New York, this 12th day of March 1908.

MAURICE J. WOHL.
HARRY HERTZBERG.

Witnesses:
JOSEPH F. GARCIA,
GEO. WELLING GIDDINGS.